Patented Mar. 20, 1945

2,372,066

UNITED STATES PATENT OFFICE 2,372,066

BIOLOGICAL PRODUCT AND PROCESS OF OBTAINING SAME

Norbert H. Fell, Detroit, Mich., assignor to Parke, Davis & Company, Detroit, Mich., a corporation of Michigan No Drawing. Application December 23, 1940, Serial No. 371,456

13 Claims. (Cl. 260—112)

The invention relates to preparation of products useful in preventing the allergic symtoms to which many people are subject as the result of their sensitivity to specific sensitizing substances. The invention relates more particularly to a product which can be artificially or synthetically produced and which is useful for developing either active or passive resistance or immunity in sensitized individuals.

I have found that I can produce, what to all intents and purposes appears to be, both active and passive immunity against histamine and similar deleterious substances which are present in the animal or human body during, or at about the same time as, the manifestations of the symptoms of anaphylaxis and other allergic reactions, whereby it is possible for sensitive individuals to avoid allergic reactions, regardless of the type of allergens to which they are sensitive.

In carrying out the invention, I combine histamine or a like substance, as before mentioned, with a large molecule or compound of high molecular weight in a haptenic linkage, or a haptene-like linkage, to form a complex which can be used as an antigen for developing a resistance, a type of refractoriness, or active immunity in the body of a sensitized individual, or for injecting into animals, from which later an antiserum can be obtained containing an apparent antibody for neutralization of the effects of. histamine or deleterious histamine-like substances.

My invention makes possible the type of treatment of allergic conditions which is non-specific and does not depend upon the recognition of and protection against individual allergens which may produce symptoms in any given case.

A valuable feature of the products of this invention is that they are effective when administered orally as well as when given by injection. For example, the antigen products described in the examples hereinafter given can be used directly to prevent allergic manifestations or can be administered to the animal organism and an antiserum later obtained from the organism by the usual methods known for obtaining antiserums. The antiserums can then be used either orally or by injection.

Since the new products of my invention function for all practical purposes like true antigens containing histamine or histamine-like compounds combined in what appears to be a true haptenic linkage with a high molecular weight compound, I shall refer hereinafter and in the accompanying claims to said new products as antigens and the serum products obtained from the use of the same in the animal body will be referred to as antibodies, immune serums or antiserums, and the like. However, I do not wish the invention to be limited in any way by any theories as to how the products of the invention carry out their functions but only by the description of the invention given herein and as defined by the appended claims.

This application is a continuation-in-part of my United States application, Serial No. 225,612, filed August 18, 1938.

The histamine or like deleterious substance which I combine with a large molecule is in most cases an imidazole compound. In order to combine the histamine or histamine-like compound with the protein or similar large molecule, a derivative of an imidazole may first be produced in which at least one of the atoms of the imidazole ring is substituted by a radical containing a chemical group capable of coupling with a protein. Such final products are therefore of the type, $$H—A—P$$

where H represents a substituted or unsubstituted imidazole radical and A represents a divalent residue joined by a valence to the group H and by another valence to a protein molecule, P.

The residue A is a coupling component and can be present in a variety of forms or types of chemical groups. The substituted or unsubstituted imidazole radical can first be combined by means of a suitable imidazole derivative with the coupling component, A, to give the combination, H—A. If a group is present in A of this combination which is capable of coupling with a protein, then H—A is directly coupled with the protein, P. If no such is present, then A of H—A is modified so that coupling will occur.

Instead of combining H and A before reacting with the protein, the coupling component, A, can first be coupled with the protein and thereafter combined with the imidazole. However, the preferred method is the first one above mentioned, because it is generally more convenient to couple the protein last.

Various protein products may be used for the coupling, but the preferred substances are those proteins which are foreign to the animal or human organism for which the antigens are intended to be used. After the antigen is prepared, it can be used or injected directly for developing active immunity in the body of the sensitized individual, or, the antigen can first be injected into animals which are bled after a suitable period of time and the serum obtained from the blood of the animals then used, with or without further purification or fractionation of the serum, to neutralize the effects of histamine or histamine-like substances responsible for the manifestations of allergy.

The invention may be illustrated by the following examples:

Example 1—Preparation of a nitro benzamide intermediate

Two holes of histamine base are dissolved in hot dry chloroform and a solution of one mole of p-nitro benzoyl chloride dissolved in ether is stirred in. A heavy precipitate forms immediately which has a waxy appearance. The supernatant liquid layer is removed from the precipitate and centrifuged to remove all insoluble material. The precipitate is dissolved in boiling water, filtered while hot from any material which fails to dissolve, and the filtrate cooled to give crystals of the imidazolyl ethyl p-nitro benzamide. The crystals can be washed with acetone and ether and then dried at 110° C. They melt at 204° C. The compound prepared by this example can be represented by the formula,

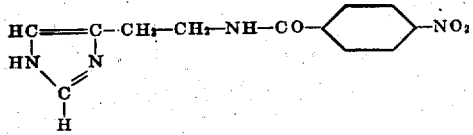

An analysis of the crystalline product gives the theoretical amount of nitrogen for a compound of this formula.

Example 2—Preparation of an amino-benzamide compound

One-half gram of imidazolyl ethyl p-nitro benzamide, prepared as in Example 1, is added to 50 cc. of a hot solution of 3.5 grams of ferrous sulfate ($FeSO_4.7H_2O$). 35 cc. of a 2.5% solution of ammonium hydroxide are then gradually added to the ferrous sulfate solution while heating on the steam bath. After adding all the ammonium hydroxide solution, the reaction mixture is heated for 30 minutes and the ferric hydroxide filtered off and the filtrate set aside to cool. The filtrate contains the imidazolyl ethyl p-amino benzamide. This compound may be obtained in solid form by allowing the filtrate to stand whereupon spontaneous crystallization sometimes occurs, or, evaporating off the solvent, or adding an organic solvent in which the amino benzamide is insoluble, thereby obtaining a precipitate or crystals which can be filtered off. The crystals have a melting-point of 189–191° C. and differ from the corresponding p-nitro compound in being very soluble in acid and very insoluble in alkali. The product of this example is represented by the formula,

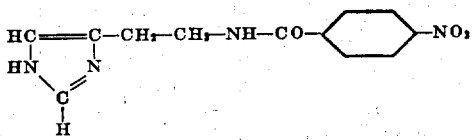

Example 3—Preparation of diazo compound of imidazolyl ethyl p-amino benzamide The filtrate from Example 2 containing the imidazolyl ethyl p-amino benzamide is neutralized with hydrochloric acid and 173 mgms. of sodium nitrite added while chilling the reaction mixture in an ice-salt mixture. The reaction mixture is acidified with 4.5 cc. of normal HCl and allowed to stand for about 20 minutes. It contains the diazotized imidazolyl ethyl p-amino benzamide.

Example 4—Preparation of a histamine-azo-protein antigen

Five grams of horse serum globulin are taken up in 50 cc. of cold water and 50 cc. of boiling water added. The solution is then adjusted to a pH of 8.1–8.2 with 10% sodium hydroxide solution. This alkaline horse serum globulin solution is chilled in an ice-bath. A solution of a diazonium salt of imidazolyl ethyl p-amino benzamide, prepared for instance as described in Examples 1, 2 and 3 and starting with about 830 mgms. of histamine base, is added slowly to the chilled horse serum globulin solution. More 10% NaOH is added until the mixture turns a blood-red color. Any insoluble material present at this stage can be centrifuged off and discarded. An excess of hydrochloric acid is added to the supernatant liquid until it becomes acid to Congo red paper. This acidification causes a heavy flocculent precipitate to come out. The precipitate is centrifuged off. The centrifuged precipitate is washed with acidified saline and then dissolved in excess dilute alkali hydroxide to give a clear blood-red solution. To this solution, 0.5% phenol is added and then a few drops of concentrated HCl to bring the pH to about 7.6, after which the solution is put through a Mandler filter. The solution is ampouled and can be submitted to sterility tests before using it for injections.

This antigen injected into animals sensitized to horse serum confers on them protection against subsequent anaphylactic shock from horse serum. Animals can be immunized with this histamine-azo-protein antigen; they can be bled subsequently, and their blood serum can be shown to contain antibodies against the complex antigen and against histamine. Such an immune serum injected into guinea-pigs sensitized to horse serum provides them with protection (passive immunity) against subsequent anaphylactic shock from horse serum.

Human subjects may also be treated in the same manner as animals to give them an active or a passive immunity which enables them to avoid the uncomfortable and deleterious symptoms accompanying allergic reactions.

Instead of using horse serum globulin in this example, I may use some other protein, such as egg alubumin or large organic molecules capable of coupling with a histamine-diazo compound or like combination of histamine, or histamine-like compound, with a diazotized amino compound.

Instead of using nitro benzoyl chloride, other nitro organic acid halides may be used to combine with the histamine to form an amide combination capable of reduction to give a free amino group for purposes of diazotization.

As already mentioned above, various other proteins may be combined with other H—A type compounds. This is illustrated by the following examples, such as Example 5 below wherein purified cow serum pseudo globulin is coupled with a diazonium salt of imidazolyl ethyl p-amino benzamide, and Example 6 below, in which a protein is coupled with chloracetyl histamine.

Example 5.—β-Imidazolyl ethyl (p-diazo proteo) benzamide 10 grams of purified cow serum pseudo globulin are prepared by precipitating cow serum with 13% sodium sulfate, discarding the precipitate and increasing the concentration of sodium sulfate to 24% and collecting the precipitate formed at the latter concentration. The precipitate is dialyzed, to remove inorganic salts, down to the equivalent of 0.8% NaCl. The dialyzed pseudo globulin is then put through a Mandler filter and the total nitrogen content determined by micro-Kjeldahl analysis. A quantity of the pseudo globulin is then used corresponding to 10 grams of protein and its volume made up to 100 cc. by adding water. The solution is then adjusted to a pH of 8.1–8.2 with 10% sodium hydroxide solution. This alkaline cow serum pseudo globulin solution is chilled and a solution of a diazonium salt of imidazolyl ethyl-p-amino benzamide, prepared for instance as described in Examples 1, 2 and 3 and starting with about 1650 grams of histamine base, is added slowly. More 10% NaOH solution is added until the mixture turns a blood-red color. Any insoluble material which appears at this point can be separated or filtered off and thrown away. Excess hydrochloric acid is added to the filtrate or supernatant liquid until it becomes acid to Congo red paper. This acidification causes a heavy flocculent precipitate to come out. The precipitate is centrifuged off. The centrifuged precipitate is washed with acidified saline and then dissolved in excess dilute alkali hydroxide to give a clear blood-red solution. To this solution, 0.5% phenol is added and then a few drops of concentrated HCl to bring the pH to about 7.6, after which the solution is put through a Mandler filter. The solution is ampouled and can be submitted to sterility tests before using it for injections.

*Example 6.—Chloracetyl histamine antigen*

The essential reactions of this example may be represented as follows:

(1) $CH_2ClCOOH + SOCl_2 \longrightarrow CH_2ClCOCl + HCl + SO_2$ (2) $CH_2ClCOCl + HC{=\!=\!=}C-CH_2CH_2NH_2 \longrightarrow$
$\qquad\qquad\qquad N\diagdown\quad/NH$
$\qquad\qquad\qquad\quad C$
$\qquad\qquad\qquad\quad |$
$\qquad\qquad\qquad\quad H$ $HC{=\!=\!=}C-CH_2CH_2-NHCOCH_2Cl$
$N\diagdown\quad/NH \qquad$ (Chloroacetyl histamine)
$\quad C$
$\quad |$
$\quad H$ (3) $HC{=\!=\!=}C-CH_2CH_2-NHCOCH_2Cl + \text{protein (P)} \longrightarrow$
$N\diagdown\quad/NH$
$\quad C$
$\quad |$
$\quad H$ $HC{=\!=\!=}C-CH_2CH_2-NHCOCH_2-P$
$N\diagdown\quad/NH$
$\quad C$
$\quad |$
$\quad H$ (1) 9.4 g. dry monochloracetic acid are placed in a 125 cc. Claisen flask fitted with a thermometer and a condenser leading to a flask connected to a Johnson water trap for absorbing HCl and $SO_2$. Thionyl chloride is added (11.0 g. or 7.06 cc.) drop by drop with shaking over a ½ hr. period. During the addition, the solution is heated on a water bath at 50–60°. When all is added, the temperature is raised to 90° and the gases and excess $SOCl_2$ are distilled off. The remaining liquid is cooled and filtered. It is chloracetyl chloride of boiling point 103° C.

(2) 500 mg. histamine are dissolved in 10 cc. hot chloroform and 1 cc. (1.5 g ) of chloracetyl chloride are added drop by drop. The solution becomes cloudy and a gummy precipitate form. It is allowed to stand ½ hr. and is then extracted with 10 cc. of water. The aqueous solution is evaporated to dryness and extracted with ether. The ether extract is dried in a desiccator until the gummy material becomes crystalline. The yield is 576 mg. of pure chloracetyl histamine analyzing approximately the theoretical percentage of nitrogen.

(3) 2 cc. of scarlet fever antitoxin mixed with 3 cc. of physiological saline and 5 cc. of phosphate buffer (pH=8), are cooled on ice, and 2 cc. of a solution of 576 mg. of chloracetyl histamine in 10 cc. of water (115 mg.) are added to this. The pH is kept constant. The solution is allowed to stand for 20 minutes. 10% trichloracetic acid is then added as a precipitant. The precipitated material is centrifuged, washed with 5% trichloracetic acid and redissolved with 0.2 N NaOH. The pH is adjusted to 7.6. 0.5% phenol is added and the material is put through a Mandler filter. It is a solution of pure chloracetyl histamine antigen of formula, $HC{=\!=\!=}C-CH_2CH_2-NHCOCH_2-\text{protein}$
$N\diagdown\quad/NH$
$\quad C$
$\quad |$
$\quad H$ This product, and also that of Example 5, is useful for the same purposes as the product of Example 4. It can be evaporated at low temperature and pressure to give a dry product capable of being dissolved in water again and used.

*Example 7—Histamine isocyano antigen*

The chief reactions of this example may be represented as follows:

(1) $H-C{=\!=\!=}C-CH_2CH_2NH_2 + CHCl_3 + 3KOH$
$\quad N\diagdown\quad/NH$
$\qquad C$
$\qquad |$
$\qquad H$ $\downarrow$ $H-C{=\!=\!=}C-CH_2CH_2-N{\equiv}C + 3KCl + 3H_2O$
$N\diagdown\quad/NH$
$\quad C$
$\quad |$
$\quad H$ (2) $H-C{=\!=\!=}C-CH_2CH_2-N{\equiv}C + O(HgO)$
$\quad N\diagdown\quad/NH$
$\qquad C$
$\qquad |$
$\qquad H$ $\downarrow$ $H-C{=\!=\!=}C-CH_2CH_2-N{=}C{=}O$
$N\diagdown\quad/NH$
$\quad C$
$\quad |$
$\quad H$ (3) $H-C{=\!=\!=}C-CH_2CH_2-N{=}C{=}O$
$\quad N\diagdown\quad/NH$
$\qquad C \qquad\qquad + \text{protein (P)} \longrightarrow$
$\qquad |$
$\qquad H$ $H-C{=\!=\!=}C-CH_2CH_2-NHC\diagup^O_{\diagdown P}$
$N\diagdown\quad/NH$
$\quad C$
$\quad |$
$\quad H$ (1) 222 mg. histamine are dissolved in 5 cc. 95% ethyl alcohol and 1 cc. chloroform and 10 cc. alcoholic KOH are added. The solution is warmed ½ hr. at 50°. It is then evaporated on the steam bath until salts crystallize out. These are extracted with absolute alcohol and the extract evaporated nearly to dryness and chilled. A heavy oily material forms. This is dried to a solid substance over $P_2O_5$. Analysis shows almost the theoretical percentage of nitrogen for histamine isonitrile.

(2) The isonitrile is dissolved in 2 cc. H₂O and 160 mg. of oxide of mercury are added. The suspension is heated at 110° for 20 minutes on an oil bath. It is cooled, filtered and the filtrate evaporated to dryness. The dry solid product is histamine isocyanate.

(3) 2 cc. of scarlet fever antitoxin, 3 cc. of physiological saline and 5 cc. of phosphate buffer (pH 8) are cooled on ice, and 100 mg. of histamine isocyanate are added. The solution is stirred and allowed to stand for ½ hr. It is precipitated with 10% trichloracetic acid, centrifuged, washed, redissolved in dilute alkaline solution and the pH adjusted to 7.2. It is a solution of histamine isocyano protein antigen and is suitable for injection or use orally for combatting the effects of allergy.

*Example 8—Histamine isocyano protein antigen*

This example is carried out like Example 7 except that cow serum pseudo globulin, such as that of Example 5, or some other protein than scarlet fever antitoxin from horses is used and the histamine isocyanate is prepared by a different method.

The reaction for preparation of the histamine isocyanate is,

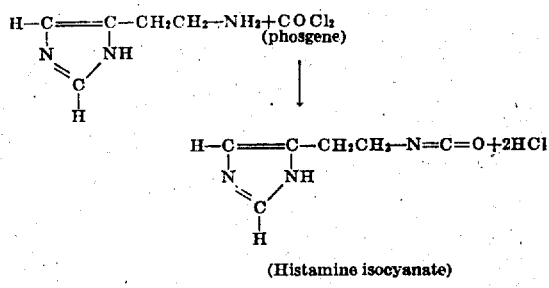

500 mg. of histamine are dissolved in 15 cc. of warm chloroform and 10 cc. of a 20% phosgene solution in toluene are added. The mixture is heated for ½ hour and the chloroform and toluene distilled off. The solution remaining is cooled, filtered and the precipitate of histamine isocyanate thereby obtained is dried.

The dry isocyanate is reacted with protein to obtain the final antigen in the manner described above under Example 7 and the antigen is useful for the same purpose as that of Example 7.

*Example 9—Preparation of 2-(azobenzidine azo proteo-) histamine*

The essential transformations in this example may be illustrated as follows:

(1) 1 gram of benzidine is dissolved in 200 ml. of concentrated hydrochloric acid and the mixture chilled to 0°–5° C. Cold normal sodium nitrite solution is added to the chilled benzidine solution until starch iodide paper is turned a blue color by the mixture. A solution of diazobenzidine chloride is thus obtained.

(2) A quantity of 0.6 gram of histamine dissolved in 100 ml. of water is chilled and poured slowly into the diazobenzidine chloride solution and the reaction mixture allowed to stand for 15 minutes. 250 ml. of a cold solution of 3 grams of sodium acetate dissolved in 500 ml. of water and 20 ml. of normal potassium carbonate solution are then added and the solution allowed to stand for 15 minutes longer. The product in this step is the result of a coupling reaction with histamine. This can be proved by coupling the product of step 2 with α-naphthol instead of a protein and analyzing the α-naphthol coupled product for nitrogen. For example, 475 ml. of the cold solution containing the reaction product of histamine and azobenzidine diazonium chloride can be reacted with 0.65 gram of α-naphthol. The α-naphthol can be added while stirring in an ice bath and the reaction mixture allowed to stand ½ hour. The blue-black precipitate which forms is filtered off, washed, dried and analyzed for nitrogen content. It analyzes approximately the theoretical (21.6% nitrogen) for 2-(azobenzidine azo-α-naphthol)-histamine of the formula, $C_{27}H_{15}ON_7$.

(3) At the end of the 15 minutes, 100 ml. of the reaction mixture are added to a chilled solution (40 ml.) of scarlet fever antitoxin diluted 1 to 5 and made alkaline with normal potassium carbonate solution. The reaction mixture is then allowed to stand on ice for ½ hour. The 2-(azobenzidine azo proteo-) histamine in the product is precipitated twice with 10% trichloracetic acid, dissolved again in alkali and phenol preservative added up to a concentration of 0.5%. The product is then put through a sterilizing Mandler filter and the hydrogen ion concentration of the filtrate adjusted to pH 7.15. This product is suitable for injection as described for the other products described in the preceding examples.

The scarlet fever antitoxin used in step 3 can be replaced by other proteins and especially other proteins foreign to the animal body to which the antigen is to be administered. Other large molecules, especially high molecular weight organic compounds, can be coupled to the histamine and its derivatives in a like manner to form similar products.

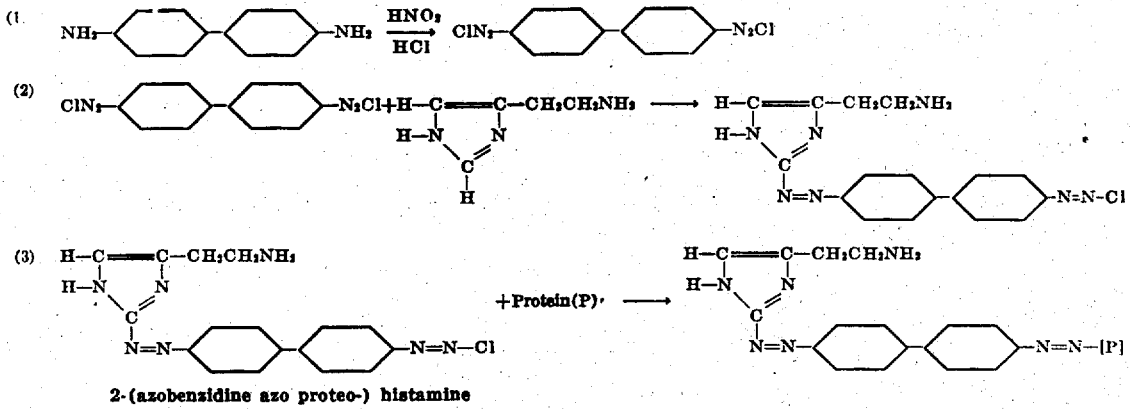

2-(azobenzidine azo proteo-) histamine

*Example 10—Reaction product of imidazolyl ethyl isocyano acetamide and protein*

The chemical transformations of this example may be represented as follows,

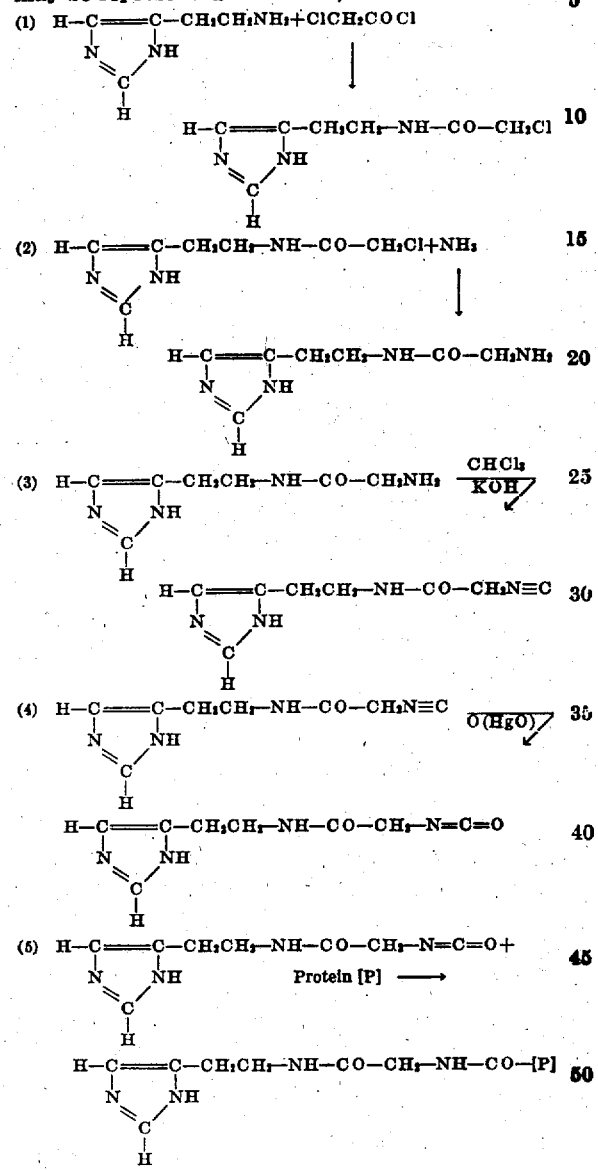

The chloracetyl histamine of the first step can be obtained for example by the procedure given for the first two steps of Example 6.

The chloracetyl histamine is reacted with ammonia, for example in the form of an excess of concentrated aqueous ammonium hydroxide solution. The resulting amino acetamide derivative of histamine is extracted with a solvent, such as ether, and the solvent evaporated. The amino acetamide derivative is reacted with potassium hydroxide and chloroform and then with mercuric oxide in a manner analogous to that given for histamine in Example 7, or with phosgene in a manner analogous to that given under Example 8. The resulting product is imidazolyl ethyl isocyanoacetamide of formula,

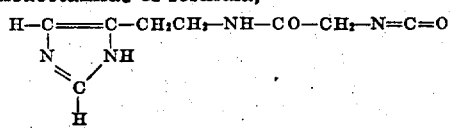

This product is finally reacted with a large organic molecule such as a protein to yield an antigenic product.

*Example 11—Reaction product of 5-(β-methylaminoethyl-)-1-imidazyl-p-benzene diazonium chloride and a protein*

The chemical transformations of this example may be represented as follows:

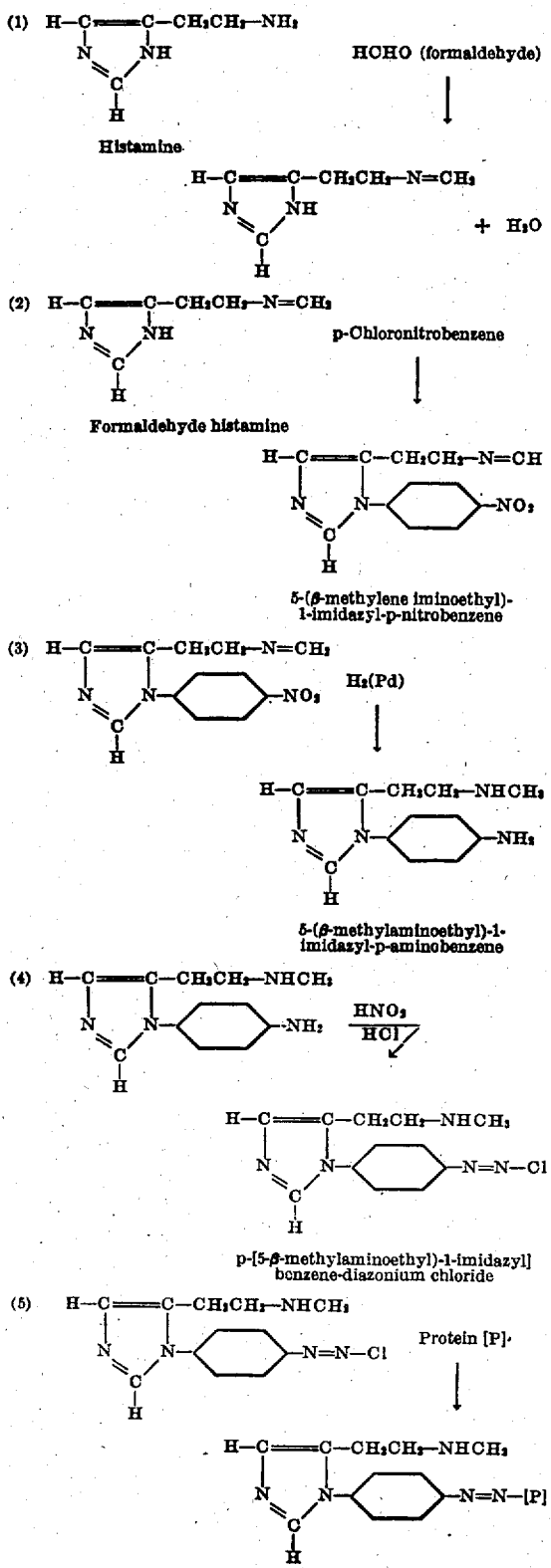

In the first step, the histamine can be dissolved in dilute acetic acid and formalin added, after which the mixture is made alkaline with sodium hydroxide solution and heated. The solvent is removed from the reaction mixture by evaporation and the dry residue extracted with ether. The ether is evaporated from the extract, leaving behind the formaldehyde histamine.

The second step is carried out by heating a mixture of the formaldehyde histamine and p-chloronitrobenzene, if necessary in the presence of a solvent.

The 5-(β-methylene iminoethyl)-1-imidazyl-p-nitrobenzene is separated in the usual manner from any solvent used and then taken up in alcohol and treated with hydrogen under pressure in the presence of a paladium catalyst for reduction of the nitro and the methyleneimino groups. The resulting 5-(β-methylaminoethyl)-1-imidazyl-p-aminobenzene is filtered from the catalyst, the alcohol is evaporated off and the solid product taken up in a solution of strong hydrochloric acid, cooled, and a solution of sodium nitrite added slowly while cooling. When the diazotization is complete, there is added to the solution of the p-[5-(β-methylaminoethyl)-1-imidazyl] benzene-diazonium chloride a solution of serum globulin made alkaline with alkali carbonate solution. After the cooled mixture stands for an hour it is precipitated with an agent used for precipitating proteins, such as trichloracetic acid, and then taken up in alkaline solution. It can be filtered through a Mandler filter to sterilize it and its pH adjusted to about 7.1 when it is ready for use.

*Example 12—Reaction product of protein and p-[β-(5-imidazyl)-ethylcarbamyl]-benzoic acid*

The steps of this example are as follows:

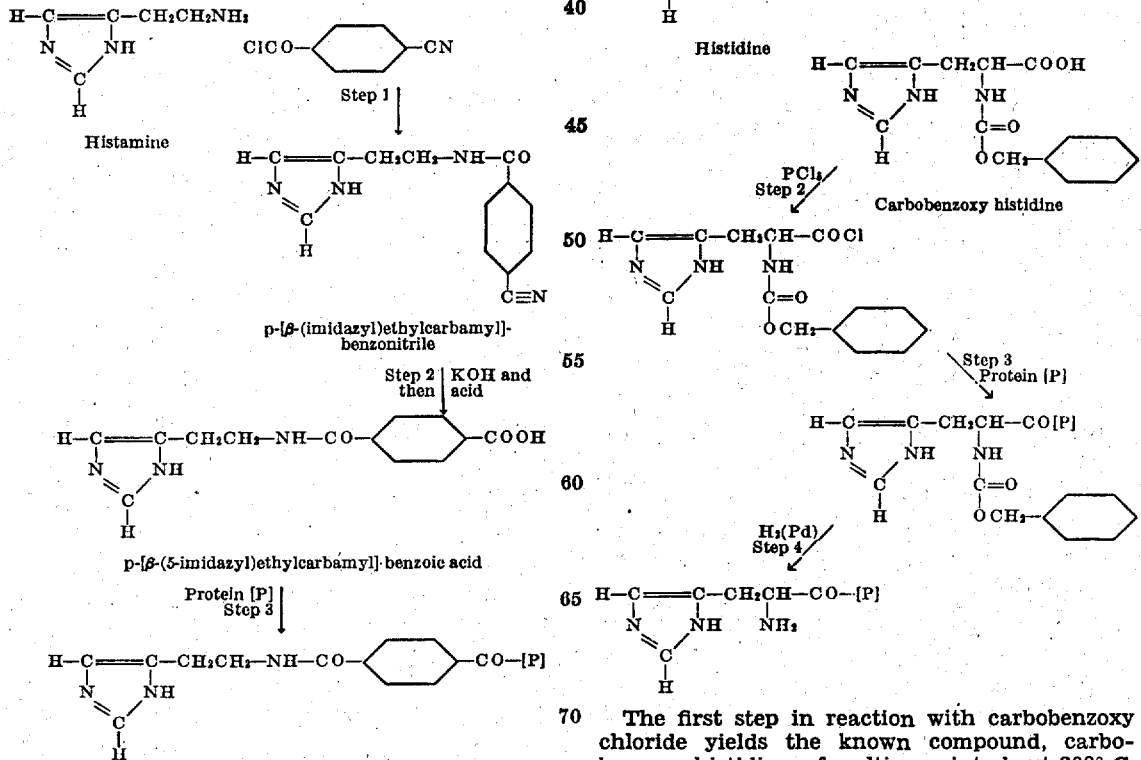

(1) 400 mg. p-cyano benzoyl chloride are dissolved in 15 cc. dry CHCl₃. 368 mg. histamine in CHCl₃ are added. A white precipitate forms immediately. This is taken up in 10 cc. methanol (hot) and filtered with 2 vols. of cold water. A white precipitate comes down. It is washed with ether and dried. The dry product is p-cyano benzoyl histamine or p-[β-(imidazyl) ethylcarbamyl]benzonitrile and melts at 194-195°. Its nitrogen content is 21.74% against a theoretical value of 21.87%.

(2) 90 mg. of p-cyano benzoyl histamine are added to 5 cc. of 10% potassium hydroxide on a steam bath and gradually dissolved. It is neutralized and evaporated to dryness with methanol, dissolved in pyridine and concentrated. The oily residue is dried over calcium chloride to a solid of melting point 60-65° C. It is p-[β-(5-imidazyl)ethylcarbamyl]benzoic acid.

(3) The benzoic acid derivative of step 2 is mixed with an excess of thionyl chloride and allowed to stand for an hour or two, after which the unreacted thionyl chloride is distilled off under reduced pressure. The residue is the acid chloride and is mixed and reacted with an equivalent quantity of an alkaline solution of protein as in the previous examples. The reaction product of the protein with the p-[β-(5-imidazyl-ethylcarbamyl] benzoyl chloride can be directly used or can be dialyzed, preferably after adjusting to the desired pH, and filtered through a sterilizing filter before use.

*Example 13—Reaction product of protein with carbobenzoxy histidine and derivatives of the same*

The main reactions of this example are indicated by the following,

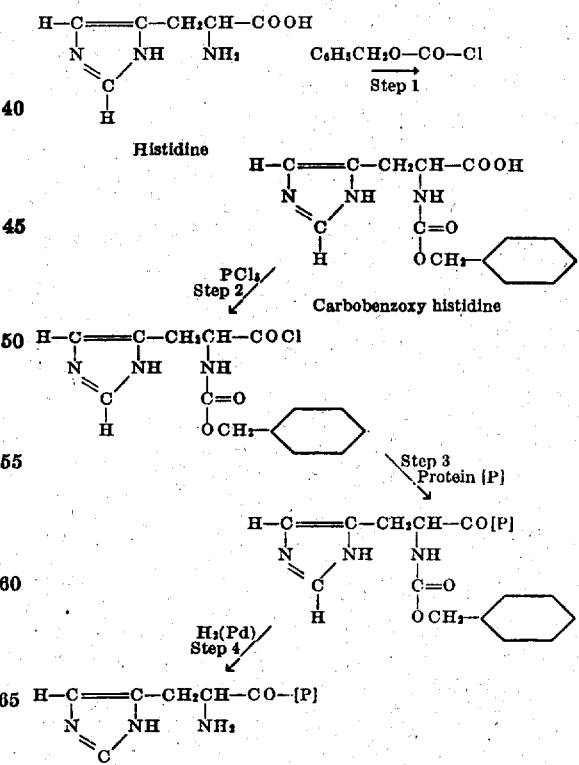

The first step in reaction with carbobenzoxy chloride yields the known compound, carbobenzoxy histidine, of melting point about 209° C. The latter compound is then converted in step 2 to its acid chloride by the usual method for converting a carboxylic acid to its acid chloride by means of phosphorus pentachloride. The acid chloride is reacted in step 3 with the protein in slightly alkaline solution to give a useful combination with protein. However, if desired, one can treat the protein reaction product with hydrogen in presence of palladium to produce reductive scission of the carbobenzoxy group, as indicated for step 4. In this case the final product is a protein derivative of histidine or carboxy histamine.

*Example 14—Reaction product of 5-(β-carbobenzoxy-amidoethyl)-1-chloracetyl imidazole with a protein*

The transformations of this example can be indicated as follows;

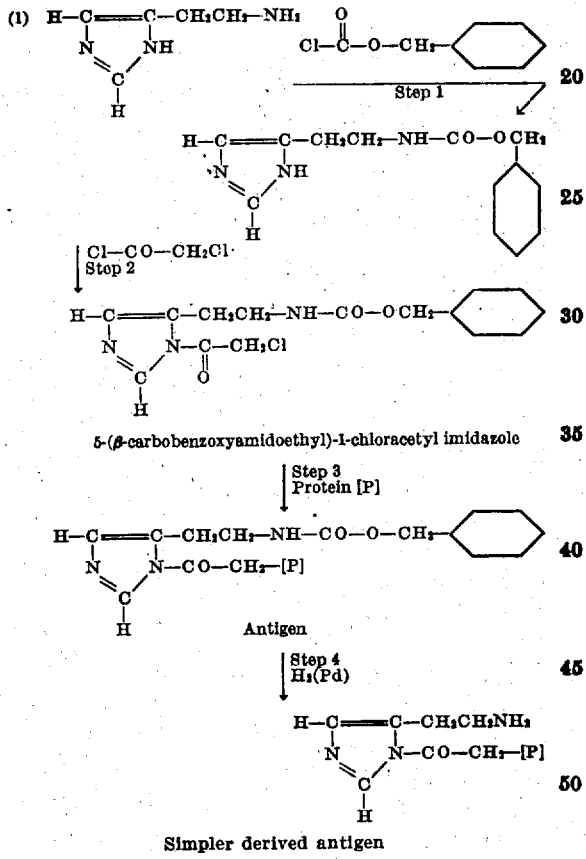

Simpler derived antigen

In the first step the new compound, 5-(β-carbobenzoxyamidoethyl)-imidazole, melting at about 190° C., can be obtained by cooling a solution of histamine in dilute alkaline solution and stirring the carbobenzoxy chloride into the solution. After a few hours the solution is extracted with ether, the ether evaporated off of the extract and the residue cooled to give a white crystalline product. The residue can be recrystallized from suitable solvents if desired.

In step 2 the chloracetyl chloride is reacted with the dry 5-(β-carbobenzoxyamidoethyl)-imidazole, for example in a manner analogous to that shown in step 2 of Example 6.

Likewise, reaction conditions similar to those in step 3 of Example 6 may be used in reacting the chloracetyl derivative of this example with a suitable protein or other large organic molecule. The final product thereby obtained is an antigen but can be further modified by a reductive scission of the carbobenzoxy group in a manner similar to that given for step 4 of Example 13.

The de-carbobenzoxy antigen which results is also an effective antigen for protecting against histamine and like products.

*Example 15—Antigen containing a sulfanilamide grouping*

The transformations of this example may be illustrated as follows;

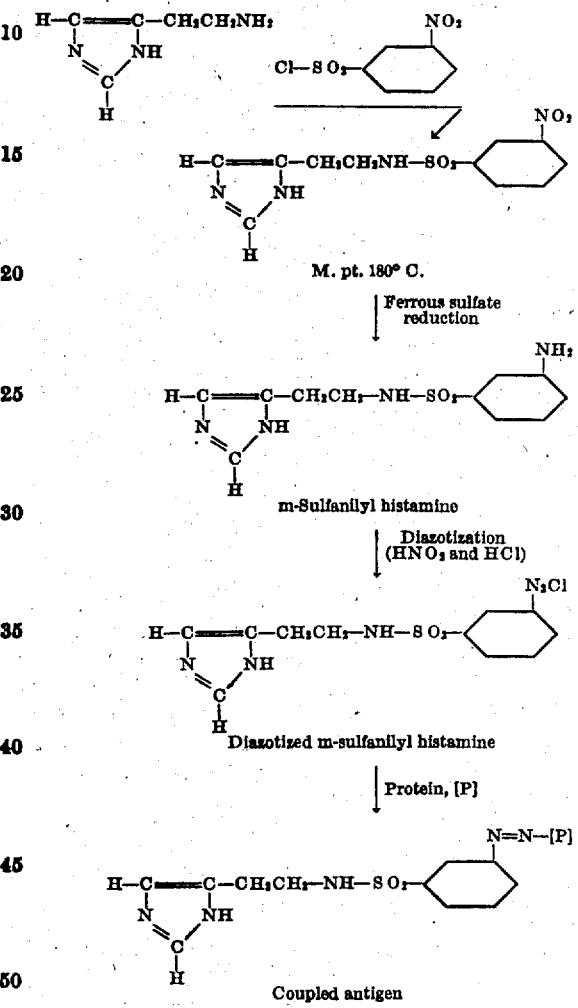

110 grams of m-nitro benzene sulfochloride are dissolved in dry chloroform and 110 grams of histamine added slowly to the solution. The waxy precipitate which forms is filtered off and then dissolved in methyl alcohol. Ether is added to the methyl alcohol solution to reprecipitate the reaction product which is filtered off. It is pure crystalline N-(m-nitrobenzene sulfonyl) histamine and is a new compound of melting point approximately 180° C.

35 grams of the N-(m-nitro benzene sulfonyl) histamine are suspended in about 800 or 900 cc. of water and the suspension added to 2000 cc. of a hot solution of 172 grams of ferrous sulfate, $FeSO_4 \cdot 7H_2O$. The mixture is boiled 15 minutes and filtered. The filtrate is adjusted to a pH of 7.8 and placed in an ice box whereupon crystals separate out and are then filtered off and dried. The crystals consist of N-(m-amino benzene sulfonyl) histamine or m-sulfanilyl histamine which has a melting point of 265° C. with some charring.

The m-sulfanilyl histamine can be diazotized by the usual procedure for diazotizing primary aryl amines which comprises reacting it with an acidic solution of nitrous acid. After the diazotized m-sulfanilyl histamine is separated out of the reaction mixture, it can be coupled with a large organic molecule, such as a protein, in the manner described for other examples given above. The product is an antigen of exceptional value.

*Example 16—Preparation of an antigen from the imidazolyl ethyl p-amino benzamide intermediate of Example 2*

The reactions of this example are represented schematically by the following,

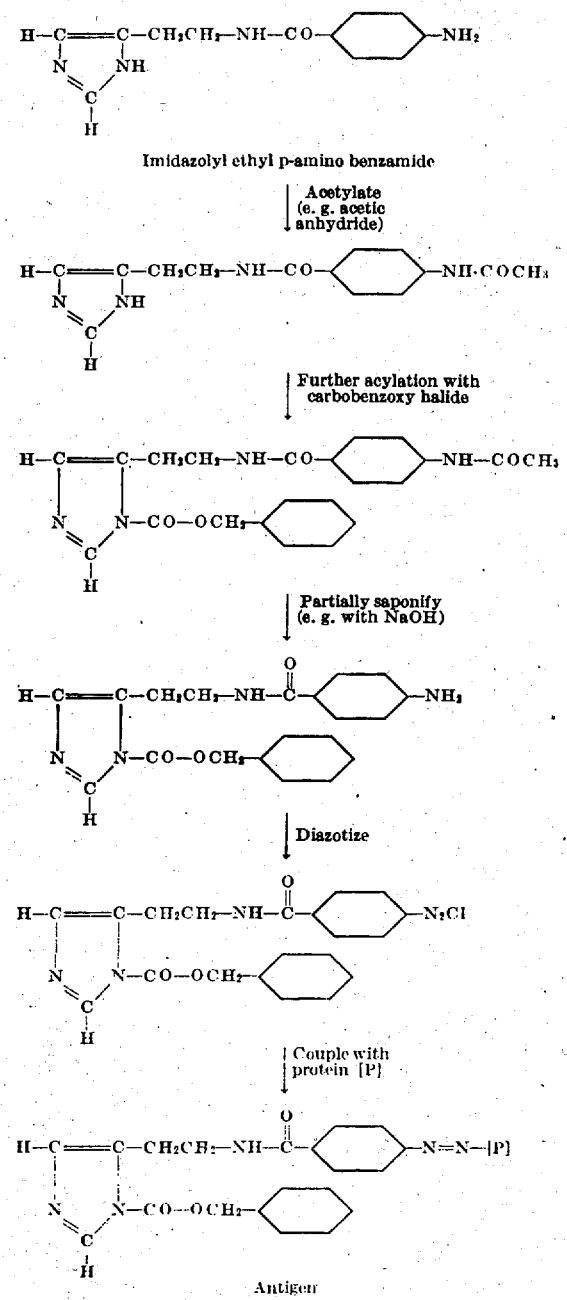

20.0 grams of imidazolyl ethyl p-amino benzamide, obtained for instance as described under Example 2, having a melting point of approximately 191° C., are dissolved in several hundred cc. of acetic anhydride and warmed for an hour. The reaction solution is cooled with ice and the crystals which separate are filtered off and thoroughly dried. They melt at about 92° C. and are substantially pure imidazolyl ethyl p-acetamino benzamide.

The acetamino derivative is dissolved in water containing alkali sufficient to make the solution slightly alkaline. An excess of carbobenzoxy chloride is added to the solution while cooling and stirring the mixture. Sodium bicarbonate can be added at intervals in order to keep the reaction mixture alkaline. The reaction liquid is allowed to stand for 2 hours and is then evaporated and chilled. The white crystals which separate are filtered off and dried. They consist of 5 - (1 - carbobenzoxy imidazolyl) - p - acetamino benzamide, which is a new compound melting at about 70° C.

By careful partial saponification the acetyl group can be hydrolyzed off of the acetamido compound. The resulting 5-(1-carbobenzoxy imidazolyl)-p-amino-benzamide can be extracted with an organic solvent from the alkaline reaction solution and recovered, for example by evaporation of the solvent or concentrating and cooling. It is then diazotized and coupled with a protein, as described in other examples given above, in order to obtain an antigenic product.

If desired, the protein-coupled antigen of this example can be converted into a simpler antigen by reductive scission of the carbobenzoxy group, as described above under Example 14. The product thus obtained is the same as that of Examples 4 and 5, when the protein of each of those examples is used.

From the foregoing description of the invention it will be apparent that, in its broader aspects, the invention embodies many different combinations heretofore unknown and also includes numerous intermediate products required for the preparation of the same which are distinctly new in themselves.

In the claims appended hereto the expression "animal body" may, in its broader sense, include the human body as well as the bodies of animals.

What I claim is:

1. Method for obtaining a product effective against deleterious compounds of histamine-like properties present in the body at the time of an allergic manifestation which comprises coupling a protein with diazotized imidazolyl ethyl p-amino benzamide.

2. The coupled reaction product of a mammalian serum protein and a derivative of histamine in which the β-(5-imidazolyl) ethyl radical of histamine is attached by way of a nitrogen atom to an organic radical comprising a radical of the class consisting of isocyanate, α-halogenated acyl, diazonium salt and carboxy halide radicals.

3. The coupled reaction product of a protein and a derivative of histamine in which the β-(5-imidazolyl) ethyl radical of histamine is attached by way of a nitrogen atom to an organic radical comprising a radical of the class consisting of isocyanate, α-halogenated acyl, diazonium salt and carboxy halide radicals.

4. The coupled reaction product of a horse serum globulin and a derivative of histamine in which the β-(5-imidazolyl) ethyl radical of histamine is attached by way of a nitrogen atom to an organic radical comprising a radical of the class consisting of isocyanate, α-halogenated acyl, diazonium salt and carboxy halide radicals.

5. The coupled reaction product of a protein and a diazotized primary amino-substituted carboxylic acid amide of histamine.

6. The coupled reaction product of a protein and a diazotized β-imidazolyl ethyl p-amino benzamide.

7. The coupled reaction product of a mammalian serum protein and a diazotized primary amino-substituted carboxylic acid amide of histamine.

8. The coupled reaction product of a mammalian serum protein and a diazotized β-imidazolyl ethyl p-amino benzamide.

9. The coupled reaction product of a horse serum globulin and a diazotized β-imidazolyl ethyl p-amino benzamide.

10. Process which comprises coupling a protein with a derivative of histamine in which the β-(5-imidazolyl) ethyl radical of histamine is attached by way of a nitrogen atom to an organic radical comprising a radical of the class consisting of isocyanate, α-halogenated acyl, diozonium salt and carboxy halide radicals.

11. Process which comprises coupling a mammalian serum protein with a derivative of histamine in which the β-(5-imidazolyl) ethyl radical of histamine it attached by way of a nitrogen atom to an organic radical comprising a radical of the class consisting of isocyanate, α-halogenated acyl, diazonium salt and carboxy halide radicals.

12. Process which comprises coupling a mammalian serum protein and a diazotized primary amino-substituted carboxylic acid amide of histamine.

13. Process which comprises coupling a horse serum globulin and a diazotized β-imidazolyl ethyl p-amino benzamide.

NORBERT H. FELL.

CERTIFICATE OF CORRECTION.

Patent No. 2,372,066.   March 20, 1945.

NORBERT H. FELL.

It is hereby certified that error appears in the printed specification of the above numbered patent requiring correction as follows: Page 2, first column, line 55, Example 2, for that portion of the formula reading "$NO_2$" read --$NH_2$--; page 9, second column, line 4, claim 11, for "it attached" read --is attached--; and that the said Letters Patent should be read with this correction therein that the same may conform to the record of the case in the Patent Office.

Signed and sealed this 29th day of January, A. D. 1946.

Leslie Frazer (Seal)   First Assistant Commissioner of Patents.

and a diazotized β-imidazolyl ethyl p-amino benzamide.

7. The coupled reaction product of a mammalian serum protein and a diazotized primary amino-substituted carboxylic acid amide of histamine.

8. The coupled reaction product of a mammalian serum protein and a diazotized β-imidazolyl ethyl p-amino benzamide.

9. The coupled reaction product of a horse serum globulin and a diazotized β-imidazolyl ethyl p-amino benzamide.

10. Process which comprises coupling a protein with a derivative of histamine in which the β-(5-imidazolyl) ethyl radical of histamine is attached by way of a nitrogen atom to an organic radical comprising a radical of the class consisting of isocyanate, α-halogenated acyl, diozonium salt and carboxy halide radicals.

11. Process which comprises coupling a mammalian serum protein with a derivative of histamine in which the β-(5-imidazolyl) ethyl radical of histamine it attached by way of a nitrogen atom to an organic radical comprising a radical of the class consisting of isocyanate, α-halogenated acyl, diazonium salt and carboxy halide radicals.

12. Process which comprises coupling a mammalian serum protein and a diazotized primary amino-substituted carboxylic acid amide of histamine.

13. Process which comprises coupling a horse serum globulin and a diazotized β-imidazolyl ethyl p-amino benzamide.

NORBERT H. FELL.

CERTIFICATE OF CORRECTION.

Patent No. 2,372,066.                                        March 20, 1945.

NORBERT H. FELL.

It is hereby certified that error appears in the printed specification of the above numbered patent requiring correction as follows: Page 2, first column, line 55, Example 2, for that portion of the formula reading "NO$_2$" read --NH$_2$--; page 9, second column, line 4, claim 11, for "it attached" read --is attached--; and that the said Letters Patent should be read with this correction therein that the same may conform to the record of the case in the Patent Office.

Signed and sealed this 29th day of January, A. D. 1946.

Leslie Frazer (Seal)                                   First Assistant Commissioner of Patents.